United States Patent
Thayyilsubramanian et al.

(10) Patent No.: US 11,349,833 B2
(45) Date of Patent: May 31, 2022

(54) MULTI-FACTOR AUTHENTICATION UTILIZING DEVICE PAIRING

(71) Applicant: KYNDRYL, INC., New York, NY (US)

(72) Inventors: Sarin Kumar Thayyilsubramanian, Bangalore (IN); Debasisha Padhi, Bangalore (IN); Anuradha Bhamidipaty, Yorktown Heights, NY (US); Firas Bouz, Lexington, KY (US)

(73) Assignee: KYNDRYL, INC., New York, NY (US)

( * ) Notice: Subject to any disclaimer, the term of this patent is extended or adjusted under 35 U.S.C. 154(b) by 208 days.

(21) Appl. No.: 16/826,231

(22) Filed: Mar. 21, 2020

(65) Prior Publication Data

US 2021/0297412 A1    Sep. 23, 2021

(51) Int. Cl.
*H04L 9/40* (2022.01)
*G06Q 20/40* (2012.01)
(Continued)

(52) U.S. Cl.
CPC ..... *H04L 63/0853* (2013.01); *G06Q 20/4012* (2013.01); *H04L 63/083* (2013.01);
(Continued)

(58) Field of Classification Search
None
See application file for complete search history.

(56) References Cited

U.S. PATENT DOCUMENTS 8,511,547 B2    8/2013    Rans
8,528,071 B1 *  9/2013    Kwan ............... H04L 63/0876
                                                      726/14
(Continued)

FOREIGN PATENT DOCUMENTS

WO    2017118923 A1    7/2017

OTHER PUBLICATIONS

Hufstetler et al ("Hufstetler," NFC Unlock: Secure Two-Factor Computer Authentication Using NFC, 2017 IEEE 14th Conference on Mobile Ad Hoc and Sensor Systems, pp. 507-510). (Year: 2017).*

(Continued)

*Primary Examiner* — Luu T Pham
*Assistant Examiner* — James J Wilcox
(74) *Attorney, Agent, or Firm* — Ken Han; Andrew M. Calderon; Roberts Calderon Safran & Cole, P.C.

(57) ABSTRACT

Aspects of the present invention disclose a method, computer program product, and system for multi-factor authentication. In response to a request for an action, the method includes one or more processors whether a first authentication credential passes validation. In response to determining that the first authentication credential does pass validation, the method further includes one or more processors determining a second authentication credential, wherein the second authentication credential includes an indication of a wireless connection between a first computing device and a second computing device. The method further includes one or more processors determining whether the second authentication credential passes validation. In response to determining that the second authentication credential passes validation, the method further includes one or more processors allowing execution of the requested response.

17 Claims, 3 Drawing Sheets

(51) Int. Cl.
*H04W 12/06* (2021.01)
*H04W 4/80* (2018.01)

(52) U.S. Cl.
CPC ........... *H04L 63/0815* (2013.01); *H04W 4/80* (2018.02); *H04W 12/06* (2013.01)

(56) References Cited

U.S. PATENT DOCUMENTS

| | | |
|---|---|---|
| 8,615,465 B2 | 12/2013 | Boutcher |
| 9,137,723 B2* | 9/2015 | Maguire ............... H04W 88/04 |
| 9,754,097 B2* | 9/2017 | Hessler ..................... H04L 9/32 |
| 10,110,574 B1* | 10/2018 | Ziraknejad ............. H04L 63/06 |
| 10,387,632 B2* | 8/2019 | Wallace .............. H04L 63/0861 |
| 10,482,462 B1 | 11/2019 | Eidam |
| 10,498,727 B1* | 12/2019 | Sherif ................... H04W 12/06 |
| 10,701,067 B1* | 6/2020 | Ziraknejad ............. H04W 12/63 |
| 11,051,163 B1* | 6/2021 | Smith ................. H04L 63/0853 |
| 2006/0282662 A1* | 12/2006 | Whitcomb .......... H04L 63/0853 713/156 |
| 2010/0082491 A1* | 4/2010 | Rosenblatt ............. G06Q 10/02 705/65 |
| 2012/0226610 A1 | 9/2012 | Gill |
| 2014/0282877 A1* | 9/2014 | Mahaffey ............... H04W 12/08 726/3 |
| 2015/0106275 A1 | 4/2015 | Wolfs |
| 2016/0165450 A1* | 6/2016 | Hunt ..................... G06F 3/0416 726/19 |
| 2017/0063968 A1* | 3/2017 | Kitchen ................. H04L 67/02 |
| 2017/0063994 A1* | 3/2017 | Lei ........................ G06F 3/0482 |
| 2017/0094510 A1* | 3/2017 | Khosravi ................ G06F 21/72 |
| 2017/0180539 A1* | 6/2017 | Payack, Jr. ....... H04M 1/72415 |
| 2017/0259072 A1* | 9/2017 | Newham ........... H04W 12/0431 |
| 2017/0366521 A1* | 12/2017 | Lei ......................... H04W 4/40 |
| 2018/0007059 A1* | 1/2018 | Innes .................... H04L 9/3228 |
| 2018/0337785 A1* | 11/2018 | Sanciangco ........... H04L 63/083 |
| 2018/0375659 A1* | 12/2018 | Kozma .................. H04L 63/083 |
| 2019/0238554 A1* | 8/2019 | Disraeli ................ H04L 63/107 |
| 2019/0305955 A1* | 10/2019 | Verma .................. H04L 9/3247 |
| 2019/0342403 A1* | 11/2019 | Shepherd ............. H04L 63/083 |
| 2019/0364041 A1* | 11/2019 | Durski .................. H04L 9/3263 |
| 2019/0373469 A1* | 12/2019 | Bradley ............ H04W 12/0433 |
| 2020/0067907 A1* | 2/2020 | Avetisov ............... H04L 67/145 |
| 2020/0067922 A1* | 2/2020 | Avetisov ................. H04L 63/18 |
| 2020/0092606 A1* | 3/2020 | Sreekanth ............ H04N 21/441 |
| 2020/0162454 A1* | 5/2020 | Jain ..................... H04W 12/084 |
| 2020/0236152 A1* | 7/2020 | Bradley ................ H04L 65/602 |
| 2020/0304542 A1* | 9/2020 | Ilincic ..................... H04L 63/18 |
| 2021/0209228 A1* | 7/2021 | Maor ...................... G06F 21/55 |

OTHER PUBLICATIONS

Noureen et al "Secure Device Pairing Methods: An Overview," International Journal of Advanced Computer Science and Applications, vol. 8, No. 9, 2017, pp. 442-451 (Year: 2017).*

Saxena et al "Universal Device Pairing using an Auxiliary Device," Symposium on Usable Privacy and Security (SOUPS) 2008, pp. 1-12 (Year: 2008).*

"Bank of America—Card-less ATM", Bank of America, © 2019 Bank of America Corporation, 3 pps., <https://promo.bankofamerica.com/cardlessatm/>.

"Method to trigger credit card transaction with the holder position", An IP.com Prior Art Database Technical Disclosure: IPCOM000224989D, Jan. 18, 2013, 3 pps.

* cited by examiner

MULTI-FACTOR AUTHENTICATION UTILIZING DEVICE PAIRING

BACKGROUND OF THE INVENTION

The present invention relates generally to the field of security, and more particularly to multi-factor authentication processes.

Authentication is the act of proving an assertion, such as the identity of a computer system user. While a username/password combination is a common way to authenticate your identity, many other types of authentication exist. For example, a multi-digit passcode to unlock a device, such as a personal identification number (PIN). A PIN is a numeric or alpha-numeric password used in the process of authenticating a user accessing a system. Multi-factor authentication (MFA) is an authentication method in which a computer user is granted access only after successfully presenting two or more pieces of evidence (or factors) to an authentication mechanism. Two-factor authentication (also known as 2FA) is a type, or subset, of multi-factor authentication. Two-factor authentication is a method of confirming users' claimed identities by using a combination of two different factors (e.g., something they know, something they have, something they are, etc.).

A smart card, chip card, or integrated circuit card (ICC) is a physical electronic authorization device, used to control access to a resource. A chip card is typically a plastic credit card-sized card with an embedded integrated circuit (IC) chip. Many smart cards include a pattern of metal contacts to electrically connect to the internal chip. Others are contactless, and some are both. Smart cards can provide personal identification, authentication, data storage, and application processing.

Near-field communication (NFC) is a set of communication protocols that enable two electronic devices (e.g., a smartphone and a reader device) to establish communication by bringing the devices within a close distance (e.g., 4 cm) of each other. NFC utilizes electromagnetic induction between two loop antennas located within each other's near field, effectively forming an air-core transformer. NFC devices can be used in contactless payment systems (e.g., credit cards and electronic ticket smart cards) and allow mobile payment to replace or supplement the systems. NFC can also be used for social networking, for sharing contacts, photos, videos or files.

Device pairing is a process utilizes in computer networking that establishes an initial linkage between computing devices to allow communication between the devices. For example, a user can utilize a pairing process to link a headset to a mobile phone, via a wireless personal area network (WPAN) connection.

SUMMARY

Aspects of the present invention disclose a method, computer program product, and system for multi-factor authentication. In response to a request for an action, the method includes one or more processors whether a first authentication credential passes validation. In response to determining that the first authentication credential does pass validation, the method further includes one or more processors determining a second authentication credential, wherein the second authentication credential includes an indication of a wireless connection between a first computing device and a second computing device. The method further includes one or more processors determining whether the second authentication credential passes validation. In response to determining that the second authentication credential passes validation, the method further includes one or more processors allowing execution of the requested response.

DETAILED DESCRIPTION

Embodiments of the present invention allow for a multi-factor authentication process that leverages wireless pairing between computing devices. Embodiments of the present invention provide a first authentication credential in response to a request. In response to a validation of the first authentication credential, embodiments of the present invention request and/or verify a connection of a first computing device to a second computing device. For example, determine information indicating that the second computing device is paired to the first computing device via a wireless personal area network (WPAN) or near-field communication (NFC) connection.

Embodiments of the present invention can then determine whether the connection to the second device provides a valid second authentication credential. In response to determining that the second authentication credential is valid, embodiments of the present invention can generate a unique identifier (ID) for the multi-factor authentication and allow completion of the corresponding action that initiated to the executed multi-factor authentication session.

Some embodiments of the present invention recognize that current authentication mechanisms for swiping chip cards is based on a single authentication mechanism (such as utilizing a personal identification number (PIN)) and that secondary authentication mechanisms are limited, particularly for determining whether a user utilizing the chip card is the authorized user. Embodiments of the present invention further recognize that utilizing the PIN as a single authentication factor for a chip card can represent security risk. Further, contactless transactions for chip cards and other computing devices can lead to additional security risks.

Various embodiments of the present invention provide advantages of utilizing a connection to an authorized computing device, indicating that the authorized computing device is within a proximity to the authentication process, as a second authentication factor. For example, embodiments of the present invention can utilize a computing device (e.g., a mobile phone) paired to a chip card (or other devices used in an authentication) as a second authentication credential. Accordingly, embodiments of the present invention can facilitate increased security (e.g., for transaction processing, account access, etc.) through a multi-factor authentication process that leverages a verified paired wireless connection to a registered computing device.

Implementation of embodiments of the invention may take a variety of forms, and exemplary implementation details are discussed subsequently with reference to the Figures.

Figure 1:
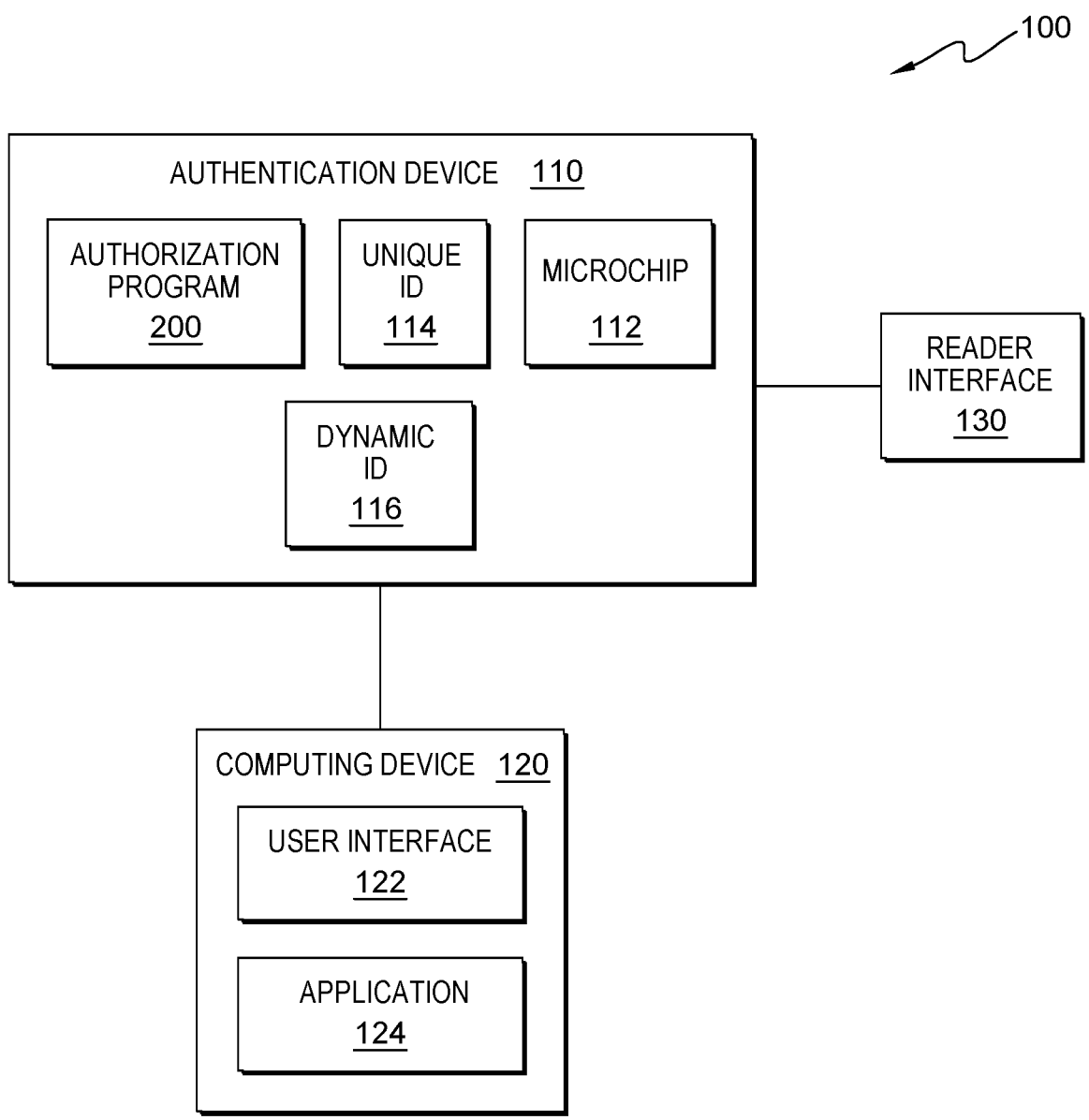
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes authentication device 110, computing device 120, and reader interface 130. In various embodiments, authentication device 110 can communicate with computing device 120 and reader interface 130 through a multitude of network communication protocols. In an example embodiment, authentication device 110 is a smart chip card that an individual can utilize to interact with reader interface 130 (e.g., via NFC for a financial transaction) to initiate an authentication session. In this example embodiment, the user can utilize authentication device 110 and computing device 120 (e.g., a mobile phone) to compete the authentication session and execute a corresponding action, in accordance with various embodiments of the present invention.

Network communications can include, for example, a local area network (LAN), a telecommunications network, a wide area network (WAN), such as the Internet, or any combination of the three, and include wired, wireless, or fiber optic connections. In general, network communication protocols can be any combination of connections and protocols that will support communications between authentication device 110, computing device 120, and reader interface 130, in accordance with embodiments of the present invention. In various embodiments, network communications facilitate communication among a plurality of networked computing devices (e.g., authentication device 110 and computing device 120), corresponding users (e.g., an individual utilizing authentication device 110 and/or computing device 120), and services (e.g., authentication device 110 and reader interface 130). In additional embodiments, network communication protocols utilized by authentication device 110, computing device 120, and reader interface 130 can include NFC transmissions, personal area networks (PANs), and WPANs, in accordance with various embodiments of the present invention.

In various embodiments of the present invention, authentication device 110 and computing device 120 may be a workstation, personal computer, personal digital assistant, mobile phone, or any other device capable of executing computer readable program instructions, in accordance with embodiments of the present invention. In general, authentication device 110 and computing device 120 are representative of any electronic device or combination of electronic devices capable of executing computer readable program instructions. Authentication device 110 and computing device 120 may include components as depicted and described in further detail with respect to FIG. 3, in accordance with embodiments of the present invention. In an example embodiment, authentication device 110 is a smart chip card and computing device 120 is a mobile computing device, such as a smartphone, a smart watch, etc.

A smart card, chip card, or integrated circuit card (ICC) is a physical electronic authorization device, used to control access to a resource. A chip card is typically a plastic credit card-sized card with an embedded integrated circuit (IC) chip. Many smart cards include a pattern of metal contacts to electrically connect to the internal chip. Others are contactless, and some are both. Smart cards can provide personal identification, authentication, data storage, and application processing.

Authentication device 110 includes microchip 112, unique ID 114, dynamic ID 116, and authorization program 200. In example embodiments, authentication device 110 is a smart chip card and microchip 112 is a chip (e.g., an integrated circuit (IC) chip) that is embedded in authentication device 110. For example, microchip 112 is a programmable chip embedded in a "chip and PIN" smart card. In an additional embodiment, authentication device 110 can be a contactless smart card (e.g., utilizing microchip 112, NFC transmissions, etc.). In further embodiments, microchip 112 can be representative of any integrated circuit chip that can facilitate communication between authentication device 110 and reader interface 130 (and potentially also computing device 120), in accordance with various embodiments of the present invention. For example, a user of authentication device 110 establishes a connection between authentication device 110 and reader interface 130 (e.g., via NFC, inserting chip card into card reader, or other form of wireless communication or pairing). In various embodiments, microchip 112 can execute, or assist in execution of authorization program 200, in accordance with embodiments of the present invention.

Unique ID 114 is representative of an identifier that corresponds to a computing device that is registered with authentication device 110 as an authorized/validated device. For example, a user pairs and validates computing device 120 with authentication device 110. In this example, authentication device 110 stores unique ID 114 to correspond to computing device 120. In various embodiments, authentication device 110 generates an instance of unique ID 114 for computing device during a pairing process between authentication device 110 and computing device 120. In another embodiment, authentication device 110 can include a dictate of a specific number of paired devices (i.e., specific a maximum number of paired devices and/or instances of unique ID 114). For example, authentication device 110 may allow pairing to only one other device (e.g., computing device 120), thus including one potential instance of unique ID 114.

In an example aspect, to generate unique ID 114 on authentication device 110 corresponding to computing device, authentication device 110 performs a one-time activity to pair with computing device 120 (e.g., a smartphone, smart watch, etc.). Subsequent to validating the pairing with computing device 120 and generating unique ID 114, authentication device 110 and computing device can communicate information, while within communication range (e.g., NFC transmissions, communications over a WPAN, etc.). In an additional aspect, the pairing process between authentication device 110 and computing device can include utilizing NFC transmissions from computing device 120 to charge an NFC unit of authentication device 110. In response to authenticating the pairing process with computing device 120, authentication device 110 generates the corresponding instance of unique ID 114.

In an example scenario, a user brings authentication device 110 (a chip card) near computing device 120 (a mobile phone) to establish NFC pairing. In response to the pairing interaction between authentication device 110 and computing device 120, authentication device 110 generates unique ID 114 for computing device 120. Unique ID 114 is encrypted on authentication device 110. Authentication device 110 can write unique ID 114 utilizing a soft protection mechanism (per NFC pairing technology) to provide additional security for unique ID 114.

In further embodiments, authentication device 110 encrypts and stores unique ID 114 on authentication device 110 as a validated paired device. In other embodiments, authentication device 110 can utilize any available pairing process (and corresponding communication protocol) to authenticate and register computing device 120 to generate the corresponding instance of unique ID 114. In various embodiments, the user associated with authentication device 110 and computing device 120 opts-in to the multi-factor authentication process of authorization program 200.

Dynamic ID 116 is representative of an identifier that authentication device 110 generates in response to a paired computing device (i.e., computing device 120) during an authentication process, such as execution of authorization program 200. In an example embodiment, computing device 120 sends a wireless transmission (e.g., NFC transmission, electronic pulse, transmission to a transceiver, etc.) to authentication device 110 for use as an authentication credential. In various embodiments, authentication device 110 generates dynamic ID 116 during operation of authorization program 200 as an indicator that computing device 120 is within wireless communication range and/or actively paired to authentication device 110 (i.e., within a defined distance) and a requested action is authorized to execute (e.g., account access, transaction, etc.). If authentication device 110 does not include an instance of dynamic ID 116, then authentication device 110 (and authorization program 200) does not have approval to proceed with a requested action.

In additional embodiments, authentication device 110 generates a new instance of dynamic ID 116 for each action that authorization program 200 manages. For example, authentication device 110 utilizes microchip 112 to generate/update dynamic ID 116 (e.g., changing a parity number for a corresponding transaction). Dynamic ID 116 and unique ID 114 can be stored on authentication device 110 and represented as any form of identification/authorization characteristic that authentication device 110 (utilizing authorization program 200) can generate and utilize, in accordance with embodiments of the present invention.

In example embodiments, authorization program 200 performs for a multi-factor authentication process, in accordance with embodiments of the present invention. In various embodiments, authorization program 200 utilizes connection of authentication device 110 (e.g., a chip card) to a paired computing device (i.e., computing device 120) as an authentication factor. In other embodiments, authorization program can be located on one or more different computing entities (e.g., computing device 120, a device (not shown) connected to reader interface 130, etc.) that can communicate with authentication device 110.

Computing device 120 includes user interface 122 and application 124. In an example embodiment, computing device 120 is a mobile computing device that is verified and paired with authentication device 110 (i.e., corresponds to unique ID 114). In other embodiments, computing device 120 can pair with multiple authentication devices (e.g., multiple different chip cards). In another embodiment, computing device 120 can trigger generation of dynamic ID 116 (e.g., via NFC transmission, WPAN communication, via transmission from a transceiver, or other network communication protocols) on authentication device 110.

User interface 122 is a program that provides an interface between a user of computing device 120 and a plurality of applications that reside on the computing device (e.g., application 114). A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 can be representative of one or more applications (e.g., an application suite) that operate on computing device 120. In an example embodiment, application 124 is an application associated with utilizing authentication device 110, such as an enterprise facilitating multi-factor authentication. In an example, application 124 is a banking application that corresponds to a banking service of authentication device 110. In other examples, application 124 can be representative of other applications that authorization program 200 can manage. In additional embodiments, application 124 can operate to facilitate communication and pairing between computing device 120 and authentication device 110. In other aspects of the present invention, application 124 can be representative of applications that provide additional functionality (e.g., camera, messaging, etc.), in accordance with various aspects of the present invention.

In example embodiments, reader interface 130 is representative of a device reader that can interact with authentication device 110, in accordance with embodiments of the present invention. For example, reader interface 130 can be an NFC reader, smart chip card reader, etc. In additional embodiments, reader interface 130 is paired to/with a computing system that utilize multi-factor authentication (utilizing and/or in cooperation with authorization program 200). For example, reader interface 130 is coupled to an automated teller machine (ATM), or another banking/financial platform, that is associated with authentication device 110. In a sample scenario, a user initiates a transaction with a computing system associated with reader interface 130 by utilizing authentication device 110 to interact with reader interface 130 (e.g., insert a chip card into an ATM).

Figure 2:
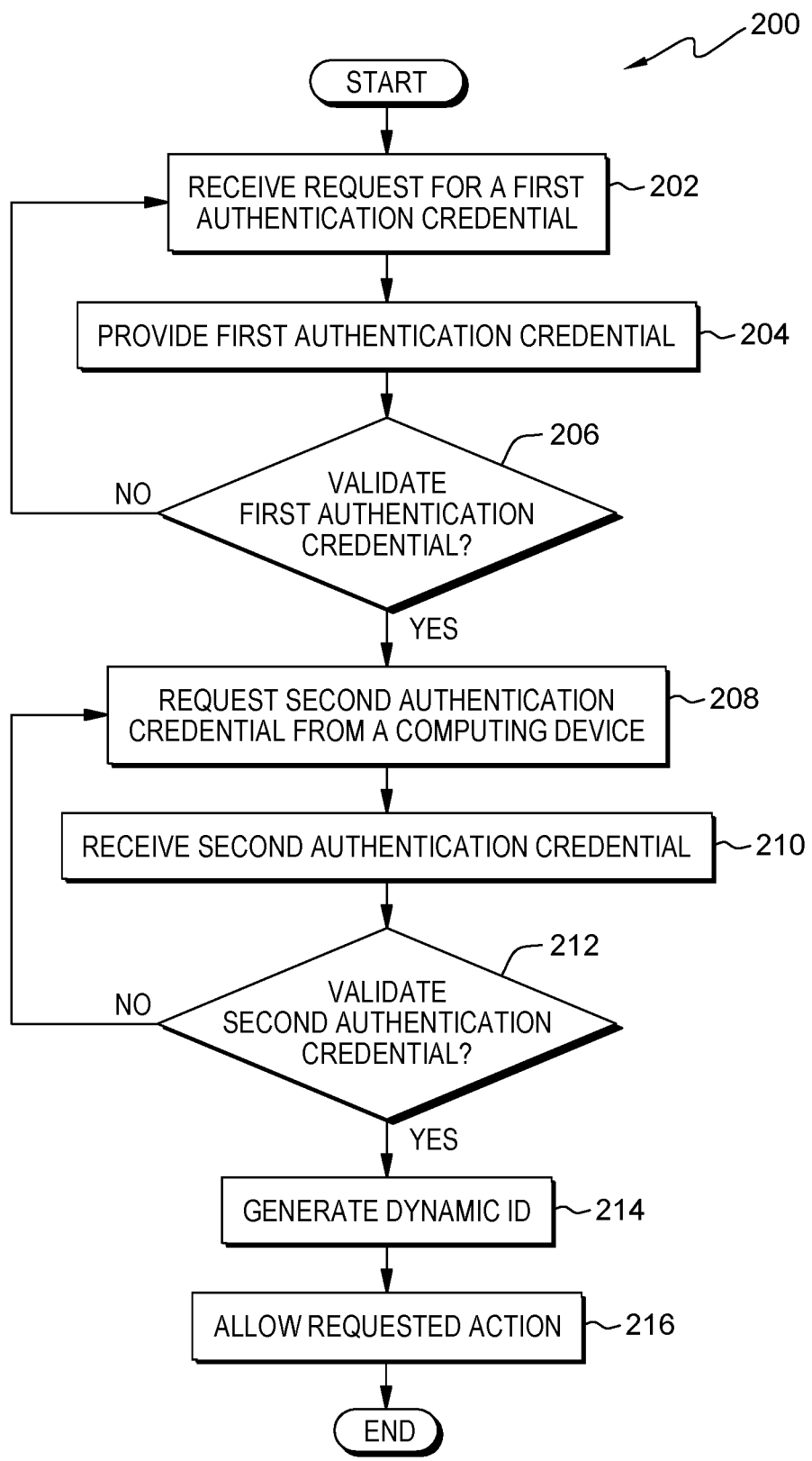
FIG. 2 is a flowchart depicting operational steps of a program for multi-factor authentication, in accordance with embodiments of the present invention.

FIG. 2 is a flowchart depicting operational steps of authorization program 200, a program for multi-factor authentication, in accordance with embodiments of the present invention. In various embodiments, authorization program 200 initiates in response to initiation of a request (by authentication device 110) for an action that requires authentication. In an example embodiment, authorization program 200 initiates in response to an interaction between authentication device 110 and reader interface 130 (e.g., ATM transaction request, point-of-sale device interaction, etc.).

In step 202, authorization program 200 receives a request for a first authentication credential. In one embodiment, authorization program 200 receives a request for a first authentication credential from reader interface 130 (or a device associated with reader interface 130). In an example embodiment, authorization program 200 receives a request for entry of a PIN as the first authentication credential. In other example embodiments, authorization program 200 can utilize any other form of defined authorization credential that is authorized for the corresponding interaction.

In an example scenario, a user initiates a banking transaction with authentication device 110 and reader interface 130 (e.g., inserts a smart chip card into an ATM). In this example scenario, authorization program 200 (on authentication device 110) receives a request for entry of a PIN as the first authentication credential.

In step 204, authorization program 200 provides the first authentication credential. In one embodiment, authorization program 200 satisfies the received query requesting the first authentication credential (from step 202). In an example embodiment, authorization program 200 transmits the first authentication credential (e.g., a PIN) to reader interface 130. In another example embodiment, a user associated with authentication device 110 inputs a PIN in response to the request for the PIN.

In decision step 206, authorization program 200 determines whether the first authentication credential passes validation. In one embodiment, authorization program 200 determines whether the provided first authentication credential (from step 204) passes validation. In example embodiments, authorization program 200 can receive positive or negative authorization confirmation from reader interface 130. In another embodiment, authentication device 110 can internally analyze the provided first authentication credential (of step 204) and determine whether the provided first authentication credential is correct (e.g., whether the correct PIN is entered).

In response to determining that the first authentication credential does not pass validation (decision step 206, NO branch), authorization program 200 receives another request for the first authentication credential (return to step 202). In another embodiment, in response to determining that the first authentication credential does not pass validation (decision step 206, NO branch), authorization program 200 cancels the requested action and ends.

In step 208, authorization program 200 requests a second authentication credential from a computing device. More specifically, in response to determining that the first authentication credential passes authentication (decision step 206, YES branch), authorization program 200 requests a second authentication credential, as an established communication channel to a paired computing device, such as computing device 120 (step 208). In one embodiment, authorization program 200 determines whether authentication device 110 is connected to the computing device that corresponds to unique ID 114 (i.e., computing device 120). In another embodiment, authorization program 200 determines whether authentication device 110 is within a wireless communication range (e.g., NFC, WPAN, etc.) to the computing device that corresponds to unique ID 114 (i.e., computing device 120). In some embodiments, authorization program 200 can establish the wireless connection between authentication device 110 and computing device 120.

In an example embodiment, authorization program 200 validates a paired connection between authentication device 110 and computing device 120, utilizing unique ID 114. In this example, unique ID 114 is an identifier that indicates that computing device 120 is the device authorized to validate authentication device 110 (pairing/validation process previously described in further detail with regard to FIG. 1). In another example embodiment, authorization program 200 can search for the presence of computing device 120 as the second authentication credential. In a further example embodiment, authorization program 200 can request to pair with computing device 120.

In step 210, authorization program 200 receives the second authentication credential. In one embodiment, authorization program 200 determines that a connection to computing device 120 is active. Authorization program 200 can then determine an identifier (e.g., device ID) corresponding to computing device 120, where authorization program 200 can utilize the identifier as the second credential. For example, authorization program 200 receives an NFC transmission from computing device 120 (e.g., a NFC transmission that charges/powers on a NFC tag of authentication device 110).

In an example embodiment, authorization program 200 identifies a computing device accessible over wireless communications (e.g., via NFC, WPAN, etc.) and pairs with the computing device. For example, the user of authentication device 110 locates computing device 120 within NFC transmission range to authentication device 110. In another example, the user of authentication device 110 locates computing device 120 within a WPAN communication range to authentication device 110, allowing completion of a pairing operation. In further embodiments, authentication device 110 and computing device 120 are already paired and then authorization program 200 can determine/derive a device identifier corresponding to computing device 120.

In decision step 212, authorization program 200 determines whether the second authentication credential passes. In one embodiment, authorization program 200 determines whether authentication device 110 is paired with the authorized device, i.e., computing device 120. As previously discussed, authentication device 110 is associated with an authorized device to utilize as the second authentication credential. Authentication device 110 stores an indicator corresponding to the authorized device (i.e., unique ID 114 as the identifier corresponding to computing device 120).

In further embodiments, authorization program 200 compares the device identifier of the paired device (i.e., computing device 120) to the stored instance of unique ID 114 of authentication device 110. Authentication device 110 encrypts and stores unique ID 114 for use by authorization program 200. Accordingly, authorization program 200 can determine the validity of the second authentication credential based on whether unique ID 114 matches the device identifier of computing device 120 (i.e., utilizing the identity of computing device 120 as the second authentication credential.

In response to determining that the second authentication credential does not pass validation (decision step 212, NO branch), authorization program 200 initiates another request for the second authentication credential from a computing device (step 208). In another embodiment, in response to determining that the second authentication credential does not pass validation (decision step 212, NO branch), authorization program 200 cancels the requested action and ends.

In step 214, authorization program 200 generates the dynamic ID. More specifically, in response to determining that the second authentication credential passes validation (decision step 212, YES branch), authorization program 200 generates an updated instance of dynamic ID 116 (step 214). In various embodiments, authorization program 200 generates and/or updates dynamic ID 116 as a signifier corresponding to the requested action (that initiated operation of authorization program 200) indicating that the requested action is authorized to proceed. For example, authorization program 200 generates dynamic ID 116 in response to validating both the first authentication credential and the second authentication credential of the multi-factor authentication.

In additional embodiments, authorization program 200 can generate a new instance of dynamic ID 116, or update an existing instance of dynamic ID 116, on authentication device 110. In one embodiment, authorization program 200 transmits a request to computing device 120 to update an instance of dynamic ID 116 associated with the requested action, i.e., to generate the second authentication credential. For example, computing device 120 can send an electronic signal to authentication device 110 to trigger generation of dynamic ID 116. In another embodiment, authorization program 200 indicate a request to microchip 116 to generate and/or update an instance of dynamic ID 116 associated with the requested action, to provide the second authentication credential. In further embodiments, authorization program 200 generates different respective instances of dynamic ID 116 for each action (e.g., transaction) that authorization program 200 facilitates through the multi-factor authentication process.

In step 216, authorization program 200 allows the requested action. In one embodiment, authorization program 200 allows the requested action (between authentication device 110 and reader interface 130) that initiated the multi-factor validation to execute. In an example embodiment, authorization program 200 allows a requested ATM transaction to complete (i.e., requested by the interaction of a chip card with an ATM) per the terms and conditions of the enterprise associated with reader interface 130 (e.g., bank, financial institution, etc.). In various embodiments, authorization program 200 validates both the first and second authentication credentials, generates/updates the corresponding instance of dynamic ID 116 for the requested action, thus completing the multi-factor authentication process for the requested action.

Figure 3:
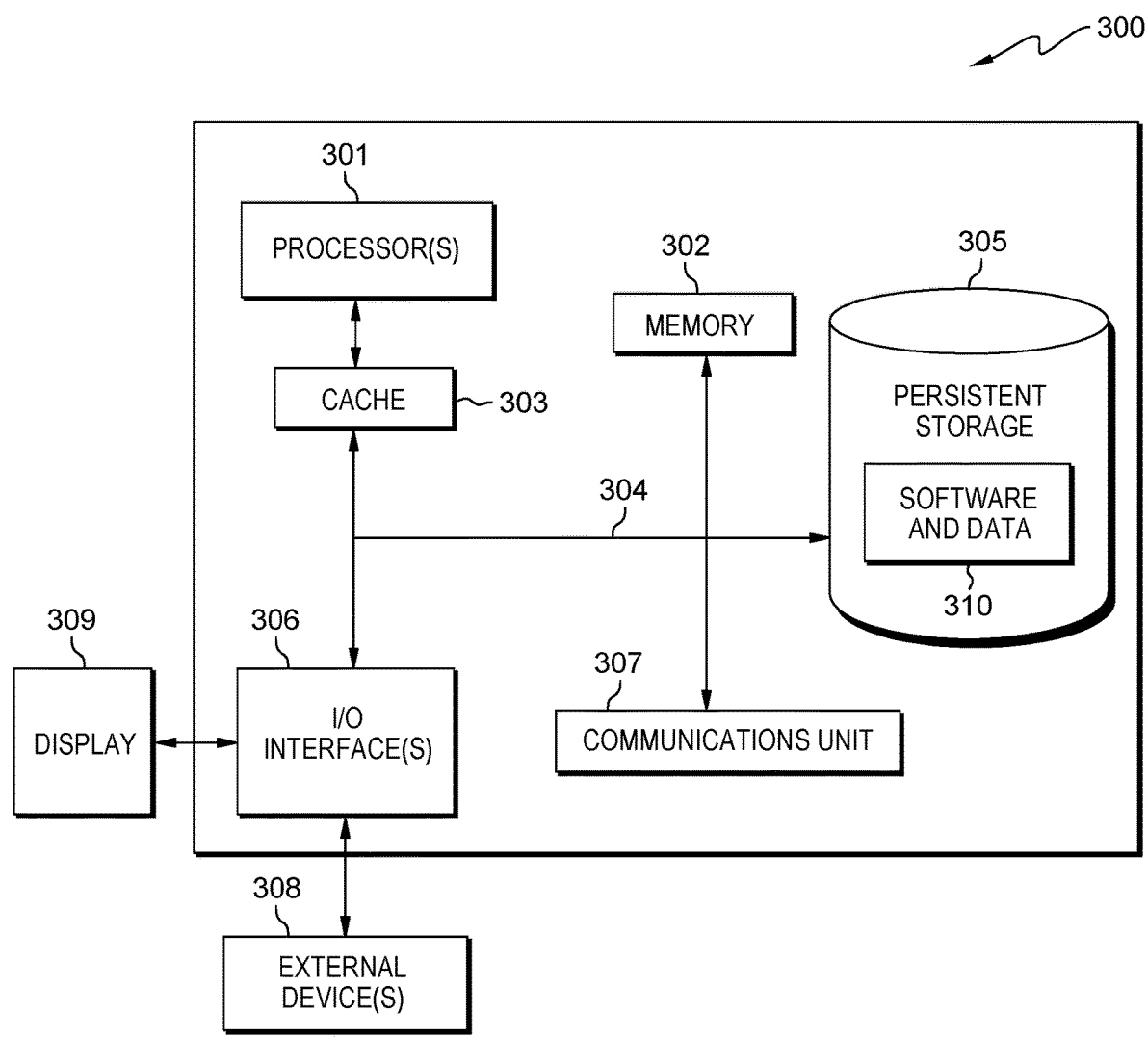
FIG. 3 depicts a block diagram of components of a computing system representative of the computing device and authentication device of FIG. 1, in accordance with an embodiment of the present invention.

FIG. 3 depicts computer system 300, which is representative of authentication device 110 and computing device 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to authentication device 110, software and data 310 includes authorization program 200, unique ID 114, and dynamic ID 114. With respect to computing device 120, software and data 310 includes user interface 122 and application 124.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
in response to a request for an action, determining, by one or more processors, whether a first authentication credential passes validation;
in response to determining that the first authentication credential does pass validation,
   validating, by the one or more processors, a paired connection between a first computing device and a second computing device, wherein the paired connection generates a unique identifier that corresponds to a pairing registration between the first computing device and the second computing device;
   in response to determining a validated paired connection between the first computing device and the second computing device, determining, by one or more processors, a second authentication credential, wherein the second authentication credential includes an indication of a wireless connection between the first computing device and the second computing device, and further comprising comparing a device identifier corresponding to the second computing device with the unique identifier corresponding to the pairing registration, wherein determining that the device identifier matches the unique identifier indicates validity of the second authentication credential;
determining, by one or more processors, whether the second authentication credential passes validation;
in response to determining that the second authentication credential passes validation, generating a dynamic identifier corresponding to the requested action to indicate that the requested action is authorized, and allowing execution of the requested action, by the one or more processors; and
generating, by one or more processors, an instance of the dynamic identifier that indicates success for authentication of both the first authentication credential and the second authentication credential for the requested action, wherein the instance of the dynamic identifier corresponds to one of a plurality of paired device registrations having a plurality of corresponding unique identifiers.

2. The method of claim 1, wherein:
the first computing device is a chip card, and the second computing device is a mobile device.

3. The method of claim 1, wherein the wireless connection between the first computing device and the second computing device is a wireless connection selected from the group consisting of: a near-field communication (NFC) connection and a wireless personal area network (W PAN) connection.

4. The method of claim 1, wherein the requested action is selected from the group consisting of: access to a resource, a financial transaction, a point-of-sale transaction, a ticket authentication, and a banking transaction.

5. The method of claim 1, wherein the first authentication credential is a personal identification number (PIN).

6. The method of claim 1, further comprising:
charging of the first device by the second device while the first and second device are in an active paired connection.

7. A computer program product comprising:
one or more computer readable storage media and program instructions stored on the one or more computer readable storage media, the program instructions comprising:
   in response to a request for an action, program instructions to determine whether a first authentication credential passes validation;
   in response to determining that the first authentication credential does pass validation,
      program instructions to validate a paired connection between a first computing device and a second computing device, wherein the paired connection generates a unique identifier that corresponds to a pairing registration between the first computing device and second computing device;
      in response to determining a validated paired connection between the first computing device and second computing device, program instructions to determine a second authentication credential, wherein the second authentication credential includes an indication of a wireless connection between the first computing device and the second computing device, and further comprising program instructions to compare a device identifier corresponding to the second computing device with the unique identifier corresponding to the pairing registration, wherein determining that the device identifier matches the unique identifier indicates validity of the second authentication credential;
   program instructions to determine whether the second authentication credential passes validation;
   in response to determining that the second authentication credential passes validation,
      program instructions to generate a dynamic identifier corresponding to the requested action to indicate that the requested action is authorized, and to allow execution of the requested action, and
      program instructions to generate an instance of the dynamic identifier that indicates success for authentication of both the first authentication credential and the second authentication credential for the requested action, wherein the instance of the dynamic identifier corresponds to one of a plurality of paired device registrations having a plurality of corresponding unique identifiers; and
   in response to determining that the second authentication credential does not pass validation, program instructions to initiate another request for the second authentication credential from the second computing device.

8. The computer program product of claim 7, wherein: the first computing device is a chip card, and the second computing device is a mobile device.

9. The computer program product of claim 7, wherein the wireless connection between the first computing device and the second computing device is a wireless connection selected from the group consisting of: a near-field communication (NFC) connection and a wireless personal area network (W PAN) connection.

10. The computer program product of claim 7, wherein the requested action is selected from the group consisting of: access to a resource, a financial transaction, a point-of-sale transaction, a ticket authentication, and a banking transaction.

11. The computer program product of claim 7, further comprising program instructions to:
charge the first computing device by the second computing device while the first computing device and the second computing device are in an active paired connection.

12. A computer system comprising:
one or more computer processors;

one or more computer readable storage media; and program instructions stored on the computer readable storage media for execution by at least one of the one or more processors, the program instructions comprising:

in response to a request for an action, program instructions to determine whether a first authentication credential passes validation;

in response to determining that the first authentication credential does pass validation, program instructions to validate a paired connection between a first computing device and a second computing device, wherein the paired connection generates a unique identifier that corresponds to a pairing registration between the first computing device and second computing device;

in response to determining a validated paired connection between the first computing device and second computing device, program instructions to determine a second authentication credential, wherein the second authentication credential includes an indication of a wireless connection between the first computing device and the second computing device, and further comprising program instructions to compare a device identifier corresponding to the second computing device with the unique identifier corresponding to the pairing registration, wherein determining that the device identifier matches the unique identifier indicates validity of the second authentication credential;

program instructions to determine whether the second authentication credential passes validation; and in response to determining that the second authentication credential passes validation, program instructions to generate a dynamic identifier corresponding to the requested action to indicate that the requested action is authorized, and to allow execution of the requested action, and program instructions to generate an instance of the dynamic identifier that indicates success for authentication of both the first authentication credential and the second authentication credential for the requested action, wherein the instance of the dynamic identifier corresponds to one of a plurality of paired device registrations having a plurality of corresponding unique identifiers.

13. The computer system of claim 12, wherein:

the first computing device is a chip card, and the second computing device is a mobile device.

14. The computer system of claim 12, wherein the wireless connection between the first computing device and the second computing device is a wireless connection selected from the group consisting of: a near-field communication (NFC) connection and a wireless personal area network (WPAN) connection.

15. The computer system of claim 12, wherein the requested action is selected from the group consisting of: access to a resource, a financial transaction, a point-of-sale transaction, a ticket authentication, and a banking transaction.

16. The computer system of claim 12, wherein the first authentication credential is a personal identification number (PIN).

17. The computer system of claim 12, further comprising program instructions to:

responsive to initiation of an active paired connection between the first computing device and the second computing device, power on an NFC tag of the first device by the second computing device.

\* \* \* \* \*